(12) United States Patent
Okada

(10) Patent No.: US 10,340,716 B2
(45) Date of Patent: Jul. 2, 2019

(54) ELECTRIC STORAGE DEVICE AND START-UP METHOD

(71) Applicant: Murata Manufacturing Co., Ltd., Kyoto (JP)

(72) Inventor: Masami Okada, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 439 days.

(21) Appl. No.: 14/760,005

(22) PCT Filed: Dec. 5, 2013

(86) PCT No.: PCT/JP2013/007150
§ 371 (c)(1),
(2) Date: Jul. 9, 2015

(87) PCT Pub. No.: WO2014/111999
PCT Pub. Date: Jul. 24, 2014

(65) Prior Publication Data
US 2015/0357840 A1     Dec. 10, 2015

(30) Foreign Application Priority Data

Jan. 17, 2013   (JP) ................... 2013-006298

(51) Int. Cl.
*H02J 7/00*     (2006.01)
*H02J 7/14*     (2006.01)
*H01M 10/44*    (2006.01)
*H02J 7/35*     (2006.01)

(52) U.S. Cl.
CPC .......... *H02J 7/007* (2013.01); *H01M 10/441* (2013.01); *H02J 7/0055* (2013.01); *H02J 7/35* (2013.01)

(58) Field of Classification Search
USPC ....... 320/128, 134, 135, 132, 114, 136, 107, 320/108, 109, 112, 162
See application file for complete search history.

(56) References Cited

U.S. PATENT DOCUMENTS

2007/0012492 A1   1/2007   Deng et al.
2010/0225277 A1*  9/2010   Ochi ..................... H02J 7/0016
                                                           320/132

(Continued)

FOREIGN PATENT DOCUMENTS

CN    202153594 U    2/2012
JP    11-317245 A    11/1999

(Continued)

OTHER PUBLICATIONS

Office Action for JP Patent Application No. 2014-557192, dated Jun. 20, 2017, 07 pages of Office Action and 04 pages of English Translation.

(Continued)

*Primary Examiner* — Alexis B Pacheco
(74) *Attorney, Agent, or Firm* — Chip Law Group

(57) ABSTRACT

Provided is an electric storage device including: a control unit, a charge/discharge management unit and a current generation unit, which are connected through an input/output unit; and an electric storage unit that is connected to the charge/discharge management unit and is connected to the current generation unit through a switch.

11 Claims, 12 Drawing Sheets

(56) References Cited

U.S. PATENT DOCUMENTS

| | | | | |
|---|---|---|---|---|
| 2011/0012424 A1* | 1/2011 | Wortberg | ............... | H02J 7/1423 307/10.1 |
| 2012/0268058 A1* | 10/2012 | Enoki | ................... | B60R 16/033 320/104 |
| 2012/0277058 A1* | 11/2012 | Ishikawa | ............. | H01M 10/486 477/3 |
| 2013/0106320 A1* | 5/2013 | Yugo | ......................... | H02P 7/00 318/139 |
| 2013/0116078 A1* | 5/2013 | Hokoi | ...................... | B60K 6/26 475/5 |
| 2013/0320766 A1* | 12/2013 | Ishishita | ................. | H02J 7/345 307/77 |
| 2014/0021918 A1* | 1/2014 | Ichikawa | ............ | B60L 11/1838 320/109 |
| 2015/0042277 A1* | 2/2015 | Tang | ................... | B60L 11/1816 320/109 |

FOREIGN PATENT DOCUMENTS

| | | |
|---|---|---|
| JP | 2001-218280 A | 8/2001 |
| JP | 2001-338697 A | 12/2001 |
| JP | 2004-187329 A | 7/2004 |
| JP | 2004-282846 A | 10/2004 |
| JP | 2010-028950 A | 2/2010 |
| JP | 2010-220279 A | 9/2010 |
| JP | 2012-227999 A | 11/2012 |
| WO | 2012/014410 A1 | 2/2012 |

OTHER PUBLICATIONS

Office Action for CN Patent Application No. 2013800701984, dated Mar. 27, 2017, 06 pages of Office Action and 09 pages of English Translation.

Office Action for JP Patent Application No. 2014-557192, dated Nov. 14, 2017, 2 pages of Office Action and 2 pages of English Translation.

Office Action for JP Patent Application No. 2014-557192, dated Sep. 5, 2017, 5 pages of Office Action and 5 pages of English Translation.

Office Action for JP Patent Application No. 2017-149626, dated May 7, 2018, 04 pages of Office Action and 03 pages of English Translation.

Office Action for EP Patent Application No. 13871897.8, dated Jun. 20, 2018.

Office Action for JP Patent Application No. 2017-149626, dated Aug. 14, 2018, 03 pages of Office Action and 03 pages of English Translation.

* cited by examiner

US 10,340,716 B2

ELECTRIC STORAGE DEVICE AND START-UP METHOD

TECHNICAL FIELD

The present disclosure relates to an electric storage device and a start-up method.

BACKGROUND ART

Electric storage devices that supply power to a load such as an electronic device are in widespread use. The electric storage device is required to be started up even when external power is not supplied during such as electric blackout. In the following Patent Literature 1, an electric storage device that is started up using power of a battery when a commercial power supply is stopped is disclosed.

CITATION LIST

Patent Literature

Patent Literature 1: JP 2010-028950A

SUMMARY OF INVENTION

Technical Problem

An electric storage device disclosed in Patent Literature 1 maintains a standby state using power of a battery. There was a problem that the standby state of the electric storage device cannot be maintained over a long period because the power of the battery is consumed in the standby state.

Therefore, one of objects of the present disclosure is to provide an electric storage device that rids power that is consumed in the standby state. Further, the present disclosure intends to provide a start-up method of the electric storage device.

Solution to Problem

According to the present disclosure, for example, there is provided an electric storage device including: a control unit, a charge/discharge management unit and a current generation unit, which are connected through an input/output unit; and an electric storage unit that is connected to the charge/discharge management unit and is connected to the current generation unit through a switch.

According to the present disclosure, for example, there is provided an electric storage device including: an electric storage unit; and a current generation unit that generates a charge current smaller than a usual charge current in a case where a voltage of the electric storage unit is smaller than a threshold value. Power output from the electric storage unit is supplied to the current generation unit at a time of start-up.

According to the present disclosure, for example, there is provided a start-up method of an electric storage device, the electric storage device including a control unit, a charge/discharge management unit and a current generation unit, which are connected through an input/output unit, and an electric storage unit that is connected to the charge/discharge management unit and is connected to the current generation unit through a switch, the start-up method including: turning off the control unit and the charge/discharge management unit and turning off the switch in a shutdown state and turning on the switch in a case of start-up from the shutdown state; generating, by the current generation unit, a predetermined current based on power supplied from the electric storage unit in response to turning-on of the switch, and outputting the generated current to the input/output unit; and turning on the control unit and the charge/discharge management unit in a case where a voltage in the input/output unit reaches an operating voltage by a current supplied from the current generation unit.

Advantageous Effects of Invention

According to at least an embodiment, standby power of the electric storage device in a standby state can be ridden.

DESCRIPTION OF EMBODIMENTS

Figure 1:
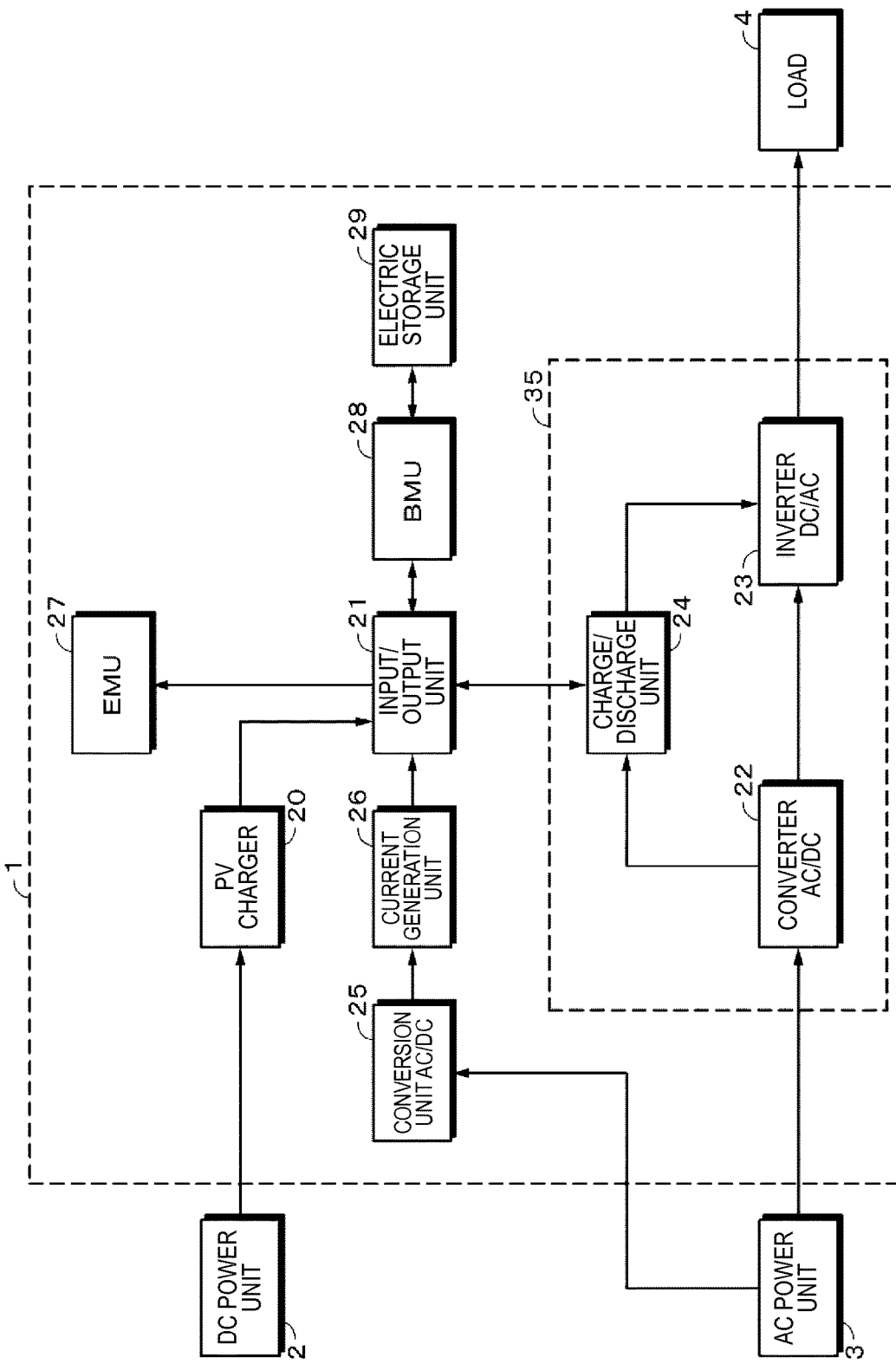
FIG. 1 is a block diagram that shows an exemplary configuration of a general electric storage device.

Hereinafter, embodiments, etc., of the present disclosure will be described with reference to the drawings. The description will be performed according to the following order.

<1. First Embodiment>
<2. Second Embodiment>
<3. Modification Example>
<4. Application Example>

Embodiments, etc., described below are preferable specific examples and the content of the present disclosure is not limited to these embodiments, etc.

Incidentally, in the following description, a state of an electric storage device that is connected to a load but does not supply power to the load and can supply the power to the load according to an instruction is appropriately called as a standby state or a shutdown state. The instruction at this time is, for example, a predetermined operation of the electric storage device by a user.

The power for the electric storage device to maintain the standby state, in other words, the power that is consumed in the standby state (shutdown state) is appropriately called as standby power. As will hereinafter be described in detail, a general electric storage device (an electric storage system) consumes the standby power to maintain the standby state using commercial power or power of a battery. According to the electric storage device in the present disclosure, the standby power can be made zero. Further, the electric storage device in the present disclosure can be started-up even when there is no external power supply such as the commercial power, and can realize an autonomous operation of the electric storage device.

In the following description, "smaller than A" may be construed to be equal to or less than A or less than A. "Larger than A" may be construed to be equal to or greater than A or to exceed A.

1. First Embodiment

"One Example of Electric Storage Unit"

An electric storage device in the present disclosure includes an electric storage unit. Before the electric storage device is described, an example of the electric storage unit will be described. The electric storage unit includes, for example, a plurality of secondary batteries. The secondary battery that constitutes the electric storage unit is, for example, a lithium ion secondary battery that includes a positive electrode active material and a carbon material such as graphite as a negative electrode active material. A positive electrode material is not particularly limited but preferably contains the positive electrode active material having an olivine structure.

As the positive electrode active material having the olivine structure, lithium iron phosphate (LiFePO$_4$), or lithium iron composite phosphate containing a different kind of atom (LiFe$_x$M$_{1-x}$O$_4$: M represents one or more kinds of metals, x is 0<x<1.) is preferred. Here, "mainly" means that a total amount of the positive electrode active material of a positive electrode active material layer is 50% or more. Further, when M includes two or more kinds, a total amount of the respective subscript numbers is selected to be 1−x.

As the M, transition elements, IIA group elements, IIIA group elements, IIIB group elements, IVB group elements, etc., can be cited. In particular, at least one kind of cobalt (Co), nickel (Ni), manganese (Mn), iron, aluminum, vanadium (V) and titanium (Ti) is preferably contained.

The positive electrode active material may be provided with a coating layer containing metal oxide (for example, one selected from Ni, Mn, Li, etc.) having a composition different from the relevant oxide or phosphate (for example, lithium phosphate, etc.), etc. on a surface of the lithium iron phosphate or the lithium iron composite phosphate.

As the positive electrode material that can absorb and release lithium (Li), lithium composite oxides such as lithium cobalt oxide (LiCoO$_2$), lithium nickel oxide (LiNiO$_2$), and lithium manganese oxide (LiMnO$_2$), which have a layered rock salt structure, and lithium manganese oxide (LiMn$_2$O$_4$) that has a spinel structure may be used.

As the graphite in the present disclosure, without particular limitation, graphite materials used in the business field can be broadly used. As the material of the negative electrode, lithium titanate, silicon (Si)-based materials, tin (Sn)-based materials, etc. may be used.

As a manufacturing method of a battery electrode according to the present disclosure, methods used in the business field can be broadly used without particular limitation.

As a battery configuration in the present disclosure, well-known configurations can be broadly used without particular limitation.

As an electrolytic solution used in the present disclosure, the electrolytic solutions used in the business field including liquid electrolyte and gel-like electrolyte can be broadly used without particular limitation.

Preferable examples of electrolyte solvent include 4-fluoro-1,3-dioxolan-2-one (FEC), ethylene carbonate, propylene carbonate, butylene carbonate, vinylene carbonate (VC), dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, n tromethane, nitroethane, sulfolane, dimethyl sulfoxide, trimethyl phosphate, triethyl phosphate, ethylene sulfite and bistrifluoromethylsulfonylimidotrimethylhexyl ammonium, and more preferable examples include 4-fluoro-1,3-dioxolan-2-one (FEC), ethylene carbonate, propylene carbonate, butylene carbonate, vinylene carbonate (VC), di methyl carbonate, diethyl carbonate, ethyl methyl carbonate, γ-butyrolactone, and γ-valerolactone.

Preferable examples of electrolyte supporting salts include lithium hexafluorophosphate (LiPF$_6$), lithium bis(pentafluoroethanesulfonyl)imide (Li(C$_2$F$_5$SO$_2$)$_2$N), lithium perchlorate (LiClO$_4$), lithium hexafluoroarsenate (LiAsF$_6$), lithium tetrafluoroborate (LiBF$_4$), lithium trifluoromethanesulfonate (LiSO$_3$CF$_3$), lithium bis(trifluoromethanesulfonyl)imide (Li(CF$_3$SO$_2$)$_2$N) and methyl lithium tris(trifluoromethanesulfonyl)(LiC(SO$_2$CF$_3$)$_3$).

The lithium ion secondary battery can be categorized into a square type, a cylinder type, etc. in accordance with a shape. As an example in the present disclosure, a cylindrical lithium ion secondary battery is used. One cylindrical lithium ion secondary battery is appropriately called as a cell. An average output voltage of the cell of the lithium ion secondary battery is, for example, about 3.0 Volt (V), and a full charge voltage is, for example, about 4.2 V. Further, a capacity of the cell of the lithium ion secondary battery is, for example, 3 ampere hour (Ah) (3000 milliampere hour (mAh)).

A sub-module is formed when a plurality of cells are connected. The submodule has a configuration in which, for example, 8 cells are connected in parallel. In this case, a capacity of the submodule becomes about 24 Ah, and a voltage becomes about 3.0 V the same as a voltage of a cell voltage.

When, for example, 16 submodules are connected in series and housed in a common case, an electric storage unit is configured. The capacity of the electric storage unit at this case becomes about 24 Ah, and the voltage becomes about 48 V (3.0 V×16). Further, the configuration of the electric storage unit can be properly changed according to use, etc. Still further, the electric storage unit may be configured of electric double layers, large capacitors, etc. without limiting to the lithium ion secondary battery.

"Configuration of General Electric Storage Device"

In order to make the understanding of the present disclosure easier, a configuration of the general electric storage device (electric storage system) will be described with reference to FIG. 1. Solid line arrows in from FIG. 1 to FIG. 7 show a flow of power. Inside the electric storage device or between the electric storage device and external instruments, communication based on specified standard is performed. However, a flow of a signal based on the communication is omitted from illustrating.

An electric storage device 1 is connected to, for example, a direct current (DC) power unit 2 and an alternating current AC) power unit 3. The DC power unit 2 is a solar battery module set, for example, on a roof, out of doors, etc. The solar battery module is formed by connecting a plurality of solar batteries into a panel and called also as a solar panel. Usually, a plurality of sheets of solar battery modules are set arranged side by side and configure a solar battery array.

A power conditioner (omitted from showing in the drawing) is disposed to the DC power unit 2. The power conditioner performs a control called as maximum power point tracking (MPPT). This control is a method that always tracks a maximum power point by following a variation of generated power of the solar battery module. A configuration in which an output of the power conditioner is connected to a power supply line of an external power system and the generated power (superfluous power) of the solar battery module is sold may be taken.

The AC power unit 3 is, for example, a commercial power. Power (alternating current power) generated at an electric generation plant of a power supplier is supplied to the AC power unit 3 through a transmission network and an electric grid, which are not shown in the drawing.

The electric storage device 1 is connected to a load 4 and supplies the power to the load 4. The load 4 can be properly set according to use other than electronic devices such as a refrigerator and a television receiver.

The electric storage device 1 includes, for example, a photovoltaic (PV) charger 20, an input/output unit 21 through which power is input/output, an AC-DC converter 22, a DC-AC inverter 23, a charge/discharge unit 24, an AC-DC conversion unit 25, a current generation unit 26, an energy management unit (EMU) 27, a battery management unit (BMU) 28, and an electric storage unit 29. The AC-DC converter 22, the DC-AC inverter 23, and the charge/discharge unit 24 form an uninterruptable power supply (UPS) unit 35.

Each unit will be schematically described. The PV charger 20 includes a DC-DC converter and a charge control unit. A voltage supplied from the DC power unit 2 by the DC-DC converter is converted to a predetermined voltage. A charge control unit controls a value of a current output from the PV charger 20. The PV charger 20 is operated when the voltage supplied from the DC power unit 2 exceeds a threshold value (for example, 100 volt (V)). To the input/output unit 21, for example, the PV charger 20, the current generation unit 26, the charge/discharge unit 24, the EMU 27 and the BMU 28 are connected.

The AC-DC converter 22 generates direct current power from the commercial power (alternating current power) input from the AC power unit 3. The direct current power output from the AC-DC converter 22 is supplied to the DC-AC inverter 23. The DC-AC inverter 23 forms alternating current power of the same level and frequency as a level and a frequency of the commercial power. The formed alternating current power is supplied to the load 4.

The charge/discharge unit 24 operates in response to charge or discharge of the electric storage device 1. For example, when the charge is performed to the electric storage unit 29, the direct current power is formed from the alternating current power input through the AC-DC converter 22 and the direct current power is output to the input/output unit 21. When the discharge is performed, the direct current power supplied from the input/output unit 21 is supplied to the DC-AC inverter 23.

The AC-DC conversion unit 25 forms the direct current power from the commercial power (alternating current) input from the AC power unit 3. The formed direct current power is supplied to the current generation unit 26.

The current generation unit 26 includes, for example, a constant-current DC-DC converter and generates a current having a predetermined current value. The predetermined current value is, for example, about 10 ampere (A). In the case where the voltage of the electric storage unit 29 is low, for example, in the case of smaller than 42 V, when a usual charge current (for example, about several tens A) is flowed to the electric storage unit 29, abnormality such as heat generation may be induced. There, in the case where the voltage of the electric storage unit 29 is smaller than 42 V, the electric storage unit 29 is initially charged by a low rate constant current of about 1.0 A. When the voltage of the electric storage unit 29 becomes larger than 42 V, the charge/discharge unit 24 is operated, and the electric storage unit 29 is charged based on the usual charge current output from the charge/discharge unit 24.

Incidentally, in the case where the electric storage unit 29 is charged by the direct current power supplied from the DC power unit 2, the similar control is performed. In this case, the PV charger 20 described above generates a low rate current, and an initial charge is performed by the low rate current generated by the PV charger 20. After the end of the initial charge, the PV charger 20 generates the usual charge current, and the electric storage unit 29 is charged by the charge current.

A controller is disposed to control the electric storage device 1. The controller includes, for example, the EMU 27 that is an example of the control unit and the BMU 28 that is an example of a charge/discharge management unit. Each of the EMU 27 and the BMU 28 includes a micro-control unit, and a communication is performed between the EMU 27 and the BMU 28.

The EMU 27 performs an overall management of the electric storage device 1. The BMU 28 observes the state (residual capacity, battery voltage, battery temperature, etc.) of the electric storage unit 29 and operates such that a proper charge/discharge operation is performed. The BMU 28 properly controls on/off of a charge control switch and a discharge control switch (these are omitted from showing in the drawing) formed of a field effect transistor (FET), etc. and controls the charge/discharge to the electric storage unit 29. Known control can be applied to the control of the charge/discharge in the BMU 28. Incidentally, although, in the present embodiment, the BMU 28 and the EMU 27 are described as separate configurations, these may be realized in one microcomputer, etc. and may be integrated in one body.

An example of a flow of power in the electric storage device 1 will be described. As shown with a dotted line (a) of FIG. 2, in the electric storage device 1, the electric storage unit 29 can be charged based on the direct current power supplied from the DC power unit 2. That is, the direct current voltage supplied from the DC power unit 2 is converted into a proper direct current voltage by the PV charger 20. The direct current voltage formed by the PV charger 20 is supplied to the electric storage unit 29 through the input/output unit 21 and the BMU 28, and the electric storage unit 29 is charged.

Figure 2:
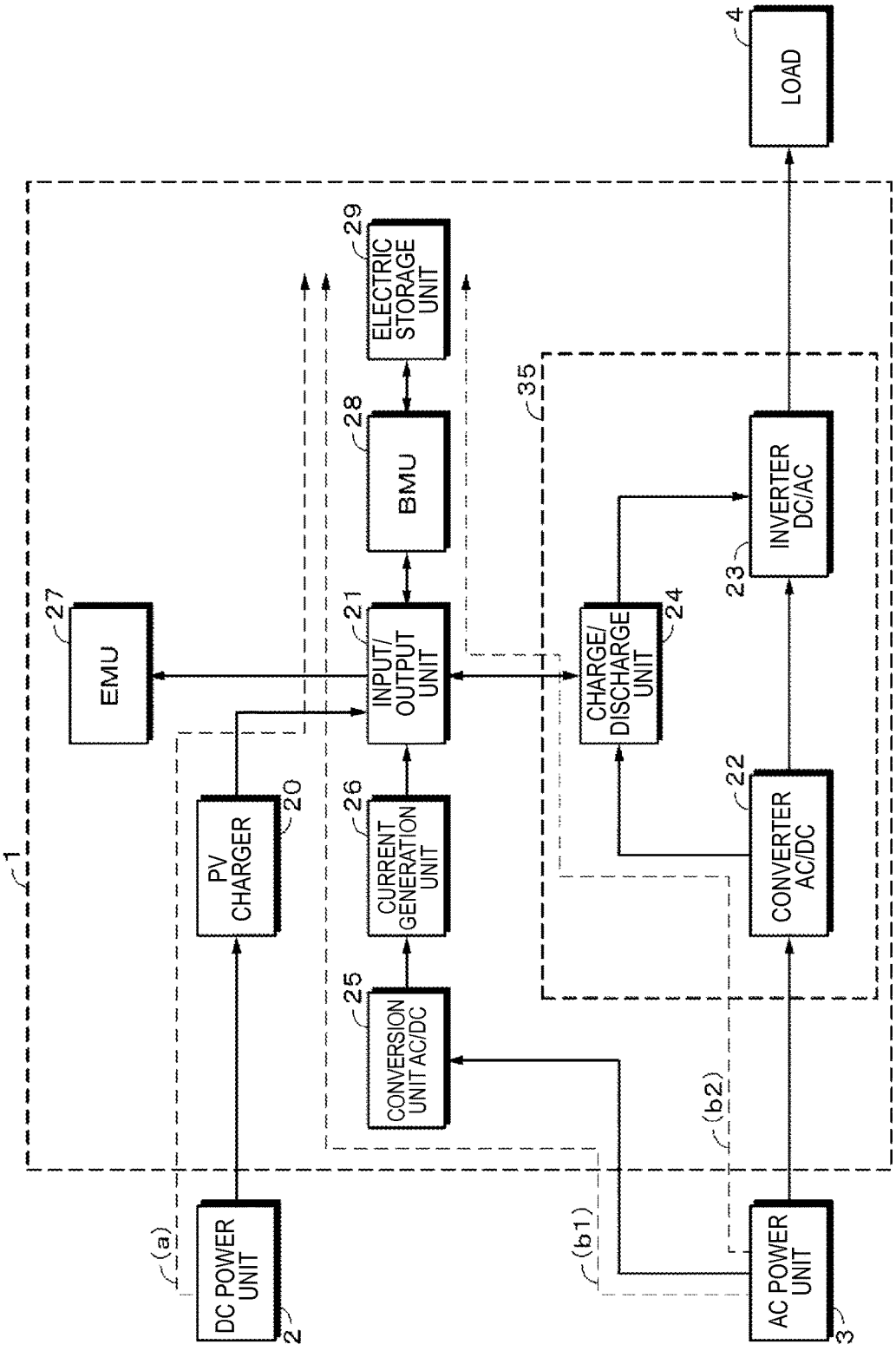
FIG. 2 is a diagram that describes an exemplary passage of power in the case where an electric storage unit is charged.

Further, as shown with a dotted line (b1) and a dotted line (b2) of FIG. 2, in the electric storage device 1, the electric storage unit 29 can be charged based on the direct current power supplied from the AC power unit 3. A passage shown with the dotted line (b1) shows a passage of power at the time of initial charge, and a passage shown with the dotted line (b2) shows a passage of power at the time of usual charge.

The alternating current voltage supplied from the AC power unit 3 is converted into the direct current voltage by the AC-DC conversion unit 25. The direct current voltage is supplied to the current generation unit 26. The current generation unit 26 generates a low rate charge current for initial charge based on the supplied direct current voltage. The charge current from the current generation unit 26 is supplied to the electric storage unit 29 through the input/output unit 21 and the BMU 28. Then, the charge by the low rate charge current is performed until the voltage of the electric storage unit 29 becomes the threshold value or more.

When the voltage of the electric storage unit 29 becomes the threshold value or higher, usual charge of the electric storage unit 29 is performed by the power that flows the passage of the dotted line (b2). That is, the alternating current voltage supplied from the AC power unit 3 is supplied to the charge/discharge unit 24 through the AC-DC converter 22. The alternating current voltage is converted into the direct current voltage by the charge/discharge unit 24. The direct current voltage is supplied to the electric storage unit 29 through the input/output unit 21 and the BMU 28, and the electric storage unit 29 is charged. The charge/discharge unit 24 performs charge according to, for example, a constant-current (CC)-constant-voltage (CV) method.

The initial charge and the usual charge are switched by the EMU 27. A switching control of the initial charge and the usual charge is performed, for example, as shown below. A switch SW1 (omitted from showing in the drawing) is connected between the AC power unit 3 and the AC-DC conversion unit 25. Further, a switch SW2 (omitted from showing in the drawing) is connected between the AC power unit 3 and the AC-DC converter 22.

The BMU 28 observes the battery voltage of the electric storage unit 29 and informs the EMU 27 of information of the battery voltage. The information of the battery voltage is informed to the EMU 27 at, for example, a predetermined cycle. The EMU 27 controls such that the switch SW1 is turned on and the switch SW2 is turned off when the battery voltage is smaller than the threshold value. By this control, the initial charge is performed. In the case where the battery voltage is equal to or greater than the threshold value or the battery voltage becomes equal to or greater than the threshold value by the initial charge, the EMU 27 turns off the switch SW1 and turns on the switch SW2. The usual charge is performed by this control.

By performing communication between the EMU 27 and the UPS unit 35 and by controlling the operation of the charge/discharge unit 24 based on the communication, the usual charge and the initial charge may be switched. The output voltage of the current generation unit 26 is set lower than the output voltage of the charge/discharge unit 24 and the output voltage of the PV charger 20. Therefore, in the case where the UPS unit 35 and the PV charger 20 are not operated, the initial charge is performed by the output power of the current generation unit 26. That is, the usual charge and the initial charge can be switched by controlling the operation of the UPS unit 35 and the PV charger 20.

Figure 3:
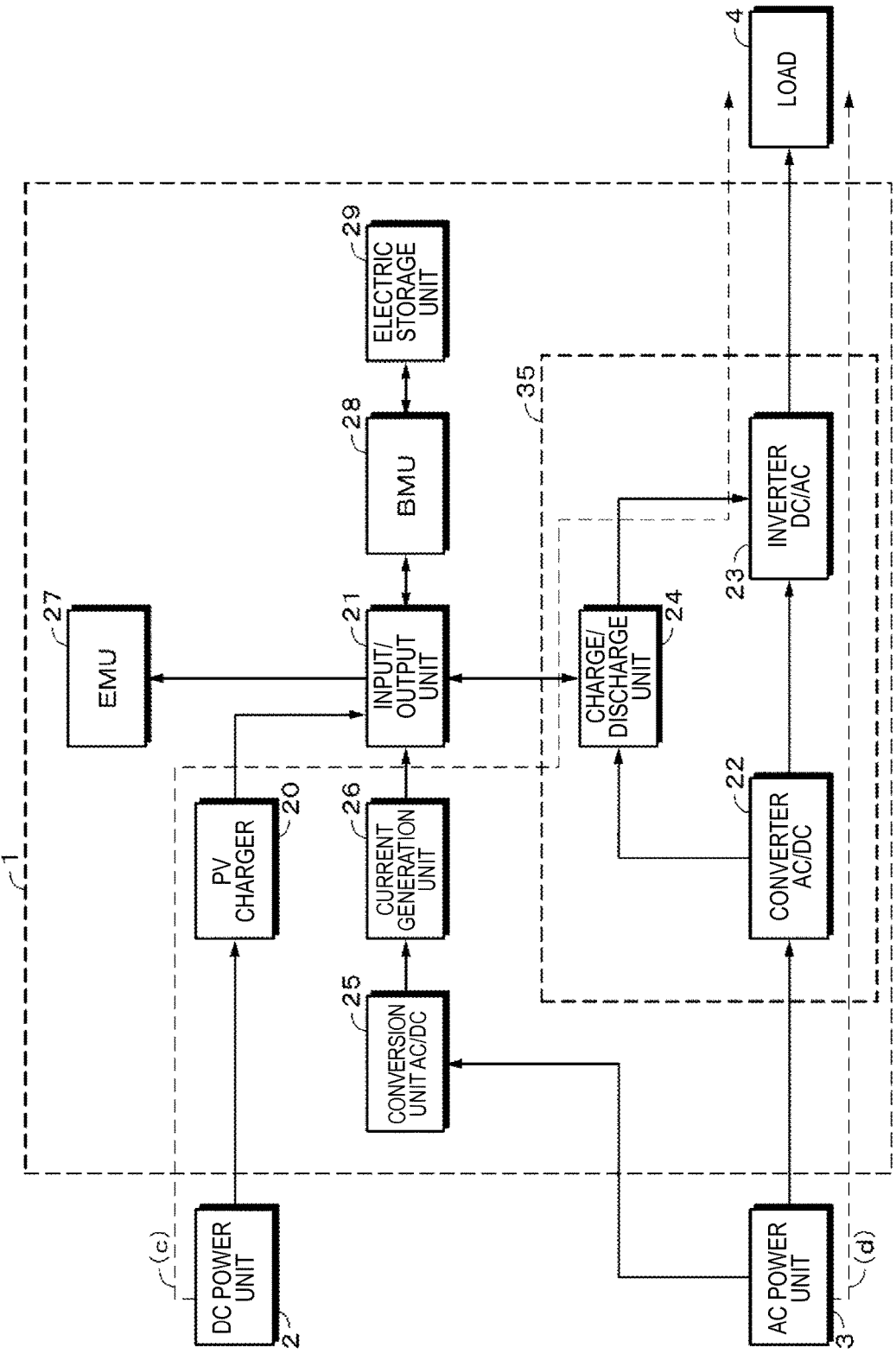
FIG. 3 is a diagram that describes an exemplary passage of power that is supplied from an external power source to a load.

As shown with a dotted line (c) of FIG. 3, the electric storage device 1 can supply the power supplied from the DC power unit 2 to the load 4. The direct current voltage supplied from the DC power unit 2 is converted into a predetermined voltage by a DC-DC converter in the PV charger 20, and the direct current power is formed. The direct current power formed by the PV charger 20 is supplied to the DC-AC inverter 23 through the input/output unit 21 and the charge/discharge unit 24.

The DC-AC inverter 23 forms alternating current power of the same level and frequency as a level and a frequency of the commercial power. The alternating current power formed by the DC-AC inverter 23 is supplied to the load 4.

As shown with a dotted line (d) of FIG. 3, the electric storage device 1 can supply the alternating current power supplied from the AC power unit 3 to the load 4. The alternating current power supplied from the AC power unit 3 is supplied to the AC-DC converter 22. The AC-DC converter 22 forms the direct current power from the AC power and outputs. The direct current power output from the AC-DC converter 22 is supplied to the DC-AC inverter 23. The DC-AC inverter 23 forms the alternating current power of a level and a frequency the same as a level and a frequency of the commercial power based on the supplied direct current power. The alternating current power formed by the DC-AC inverter 23 is supplied to the load 4.

When a switch is disposed at a proper position of a passage of each power and each switch is properly turned-on or turned-off, input of the power to the electric storage device 1 can be switched. For example, in each of between the DC power unit 2 and the PV charger 20 and between the AC power unit 3 and the AC-DC converter 22, a switch is provided. The EMU 27 controls the PV charger 20 and the UPS unit 35 by communication, and the PV charger 20 and the UPS unit 35 may be on/off controlled. According to the control, a supply passage of the power to the load 4 may be switched.

Figure 4:
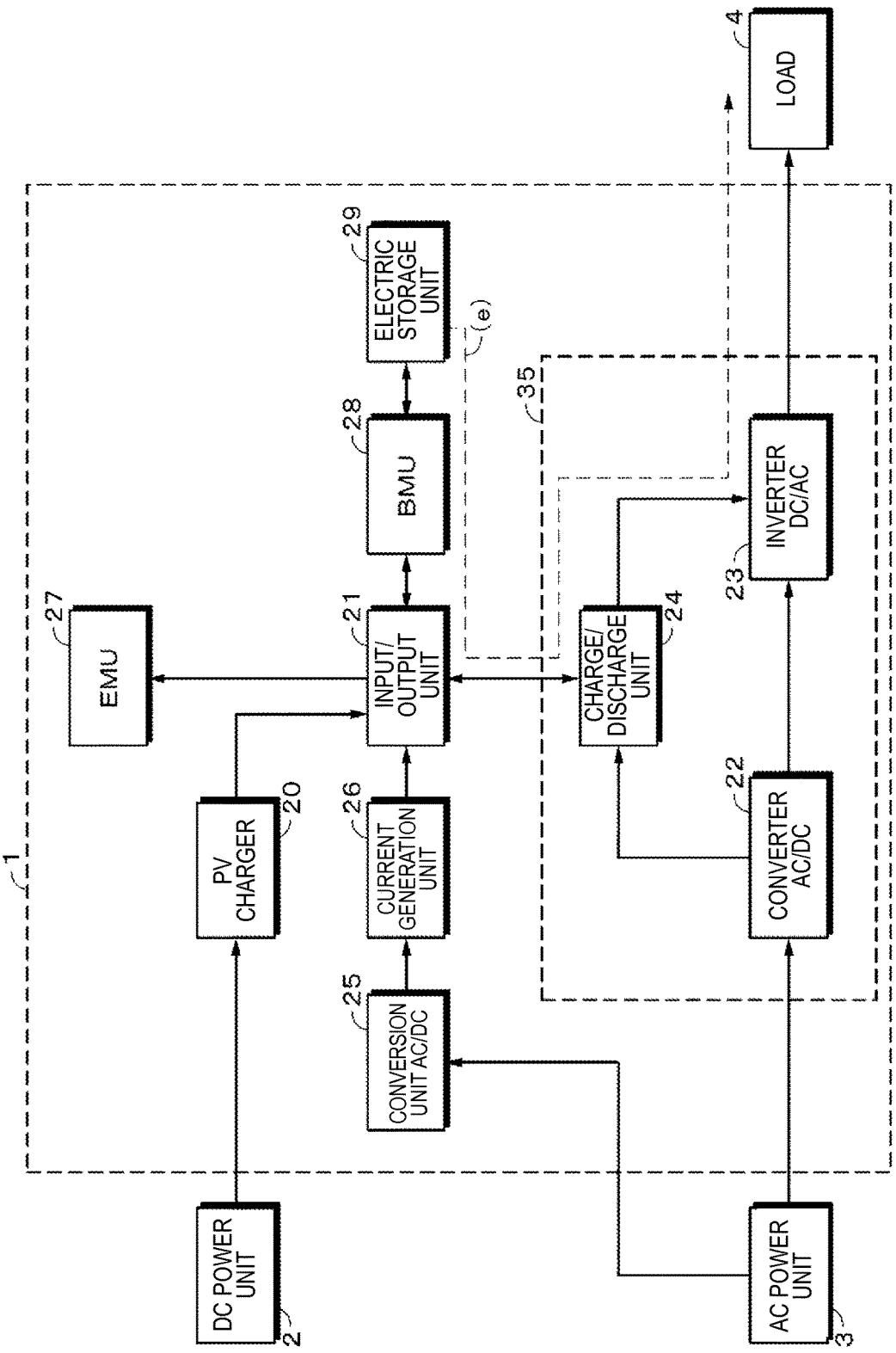
FIG. 4 is a diagram that describes an exemplary passage of power that is supplied from the electric storage unit to the load.

As shown with a dotted line (e) of FIG. 4, the electric storage device 1 can supply the power due to the discharge of the electric storage unit 29 to the load 4. The direct current power due to the discharge of the electric storage unit 29 is supplied to the DC-AC inverter 23 through the BMU 28, the input/output unit 21 and the charge/discharge unit 24. The DC-AC inverter 23 forms the alternating current power of a level and a frequency the same as a level and a frequency of the commercial power. The alternating current power formed by the DC-AC inverter 23 is supplied to the load 4.

Figure 5:
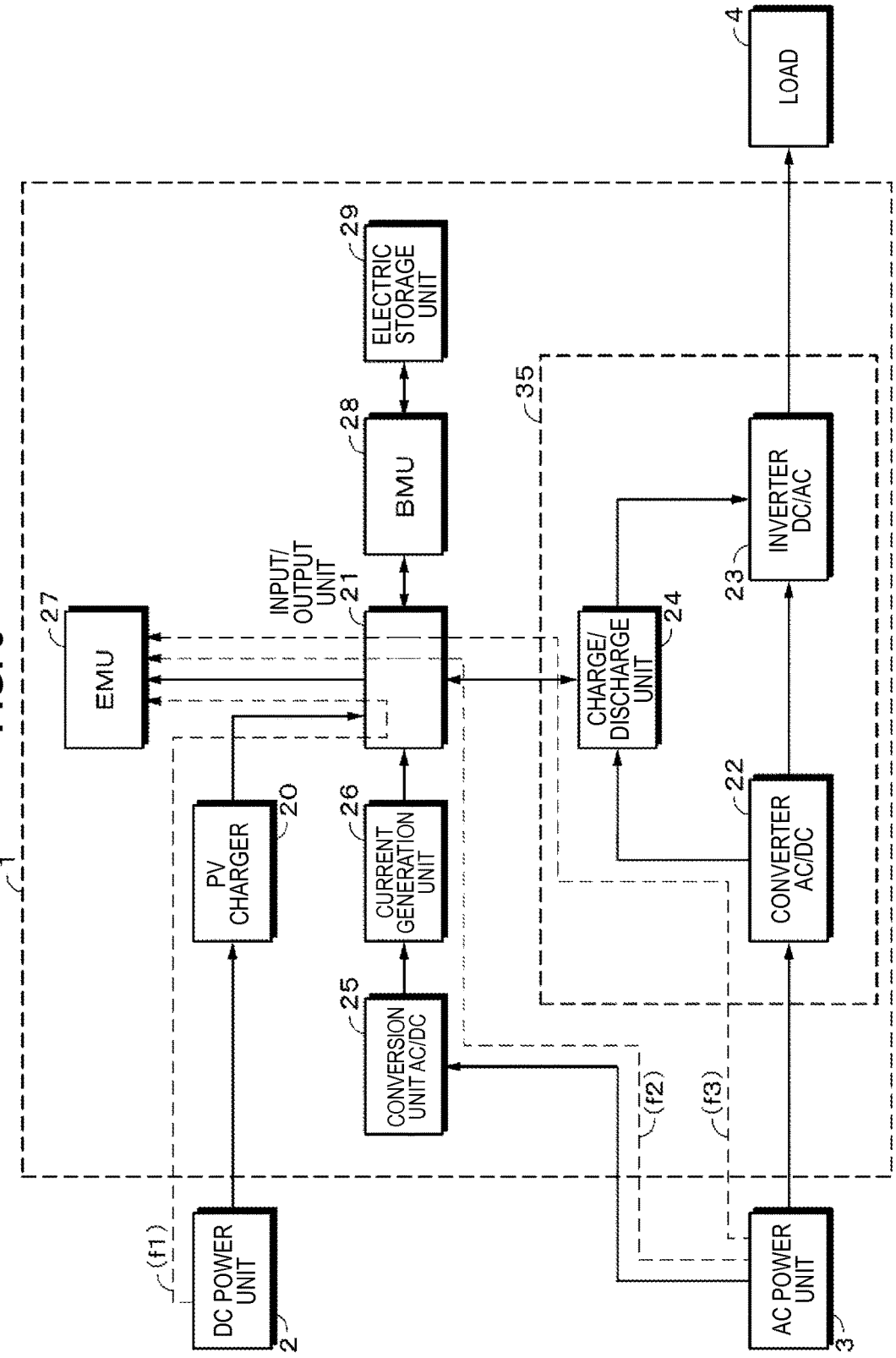
FIG. 5 is a diagram that describes an exemplary passage of power that is supplied to an EMU.

Incidentally, in order to start up the above-described electric storage device 1, it is necessary to supply the power to at least the EMU 27. In the electric storage device 1, the power supplied from the DC power unit 2 or the AC power unit 3 through, for example, the passages shown with a dotted line (f1), a dotted line (f2) and a dotted line (f3) of FIG. 5 is supplied to the EMU 27. Here, in the case where the power is not supplied from the DC power unit 2 and the AC power unit 3 due to the blackout, the bad weather etc., the electric storage device 1 cannot be started up. In an environment where stoppage of power supply is assumed, even when the electric storage device 1 is not used, the power supply is continued to the EMU 27 and the BMU 28, and the standby state is maintained. Since the power is always used to maintain the standby state, there is inconvenience from the cost point of view, etc.

On the other hand, it is considered to supply, in place of the DC power unit 2 and the AC power unit 3, the power of the electric storage unit 29 to the EMU 27 and the BMU 28. However, it becomes difficult to maintain the standby state in the case where the remaining capacity of the electric storage unit 29 decreased due to consumption of the power for maintaining the standby state. There, the electric storage device in the present disclosure makes the standby power zero while starting up the electric storage device by the power of the electric storage unit. Hereinafter, an example of the electric storage device in the present disclosure will be described in detail.

"Configuration of Electric Storage Device in Present Disclosure"

Figure 6:
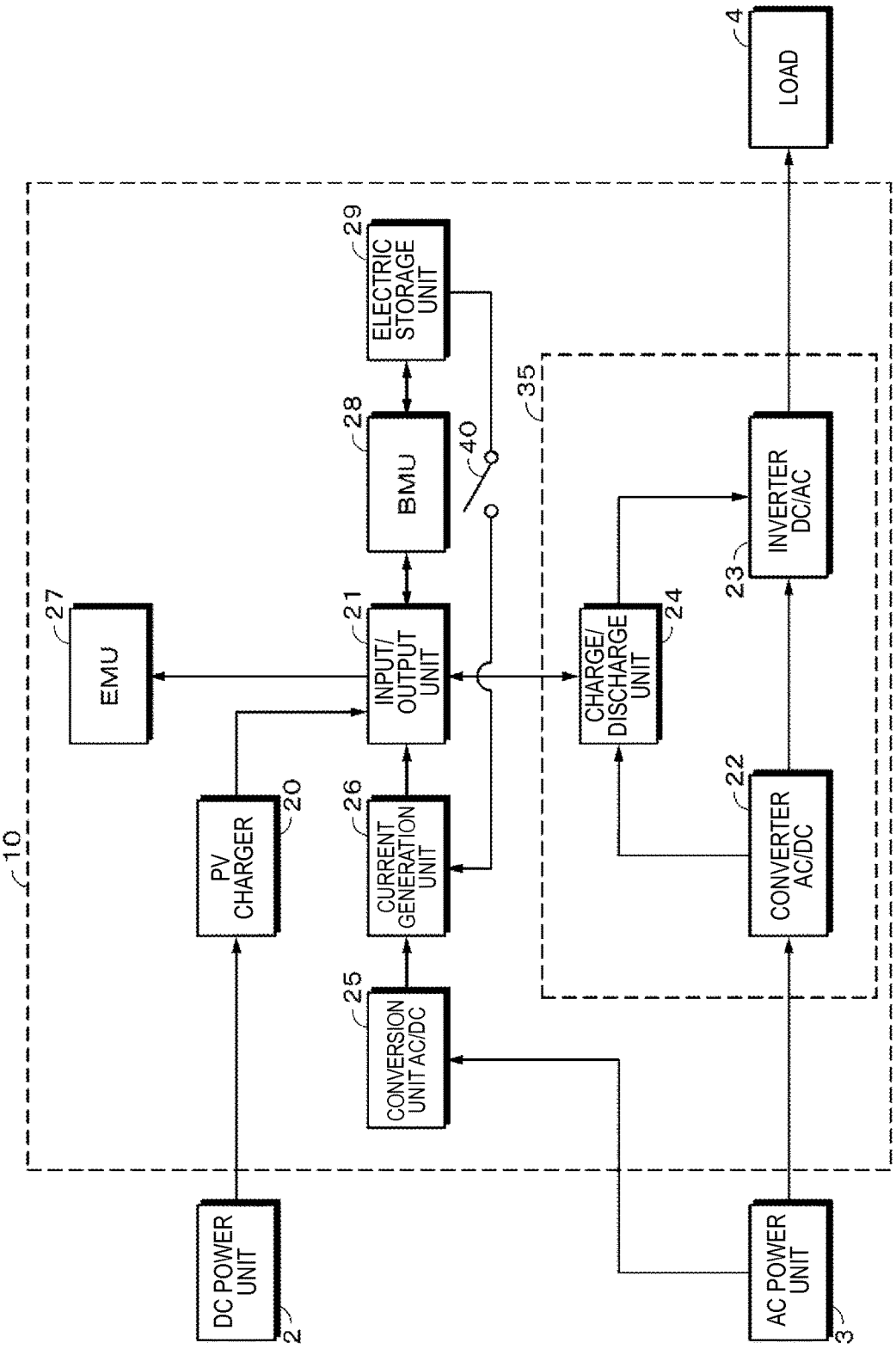
FIG. 6 is a block diagram that describes an exemplary configuration of the electric storage device in the present disclosure.

FIG. 6 shows an exemplary configuration of an electric storage device (electric storage device 10) in the present disclosure. In the electric storage device 10, the like members the same as those of the electric storage device 1 will be identified by the like reference numerals, and duplicated description will be omitted.

In the electric storage device 10, the electric storage unit 29 and the current generation unit 26 are connected through a switch SW40. The switch SW40 is, for example, a button disposed to an exterior case of the electric storage device 10. The switch SW40 is turned off in the standby state. Further, in the standby state, the EMU 27 and the BMU 28 are turned off. That is, the electric storage unit 29 is separated from each unit in the electric storage device 10 in the standby state. Therefore, the power of the electric storage unit 29 is not consumed in the standby state, and the standby power becomes zero.

A user of the electric storage device 10 pushes down the button for, for example, about a few seconds and turn on the switch SW40 when starting up the electric storage device 10. By continuing the push down of the button for about a few seconds, the electric storage device 10 is started up. After the start-up of the electric storage device 10, the user releases the push down of the button and the switch SW 40 is turned off. Since the switch SW 40 is turned off, the power of the electric storage unit 29 is not directly supplied to the current generation unit 26 after the start-up.

"Start-Up Processing of Electric Storage Device"

An example of a start-up processing of the electric storage device 10 will be described in detail. In response to turning-on of the switch SW40, the direct current power of the electric storage unit 29 is supplied to the current generation unit 26. The current generation unit 26 generates a low rate current based on the direct current power supplied from the electric storage unit 29. This current is a current of about 1.0 A the same as a low rate charge current in the initial charge. The low rate current generated by the current generation unit 26 is supplied to the input/output unit 21.

When the current is supplied from the current generation unit 26, the voltage in the input/output unit 21 gradually increases. When the voltage in the input/output unit 21 exceeds a predetermined value, units (EMU 27 and BMU 28, for example) connected to the input/output unit 21 are started up. Here, the predetermined value is a voltage (operating voltage) necessary for the EMU 27 and the BMU 28 to operate. The operating voltage of the EMU 27 and the operating voltage of the BMU 28 may be the same or different from each other.

After the EMU 27 and the BMU 28 are started up, the electric storage unit 29 is connected to each unit of the electric storage device 10 through the BMU 28. Thus, the standby power can be made zero and, at the same time, the electric storage device 10 can be started up by using the power of the electric storage unit 29.

Here, in the case where any one of the units connected to the input/output unit 21 is broken down or a connecting line is short-circuited, the voltage in the input/output unit 21 does not increase even when the current is supplied from the current generation unit 26. That is, the voltage in the input/output unit 21 does not reach the operating voltage of the EMU 27 and the EMU 28, and the electric storage device 10 is not started up. The electric storage unit 29 is not connected to each unit of the electric storage device 10 since the EMU 27 and the BMU 28 do not work. Thus, the electric storage unit 29 can be prevented from being connected to the unit having a failure such as malfunction, etc. when the power of the electric storage unit 29 is supplied through the current generation unit 26. Then, failure (secondary failure) of the electric storage unit 29 due to the connection of the electric storage unit 29 to the unit having the failure can be prevented.

Further, when the electric storage unit 29 is connected directly to the EMU 27, etc., an inrush current flows, and the EMU 27, etc. may be damaged. However, according to the electric storage device in the present disclosure, the EMU 27, etc. can be prevented from being damaged by the inrush current since the power of the electric storage unit 29 is output through the current generation unit 26.

Figure 7:
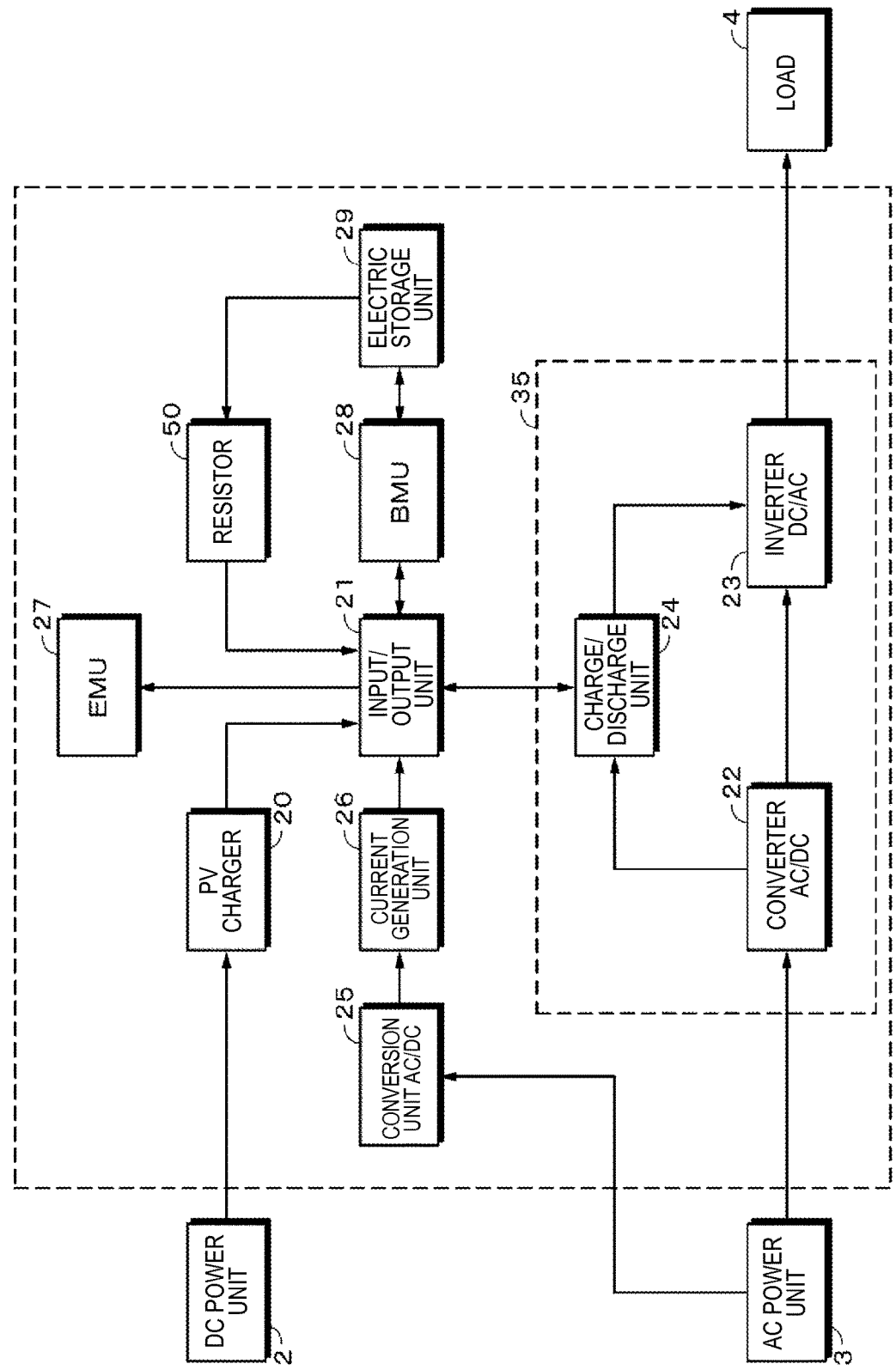
FIG. 7 is a diagram that describes a configuration that supplies power of the electric storage unit through a resistor.

The electric storage device can be started up also by the power through a resistor 50 as shown in FIG. 7, for example. However, in the case where a unit connected to the input/output unit 21 has a failure, etc., a configuration shown in FIG. 7 is not preferable because the relevant unit may generate heat and cause a secondary failure.

Figure 8:
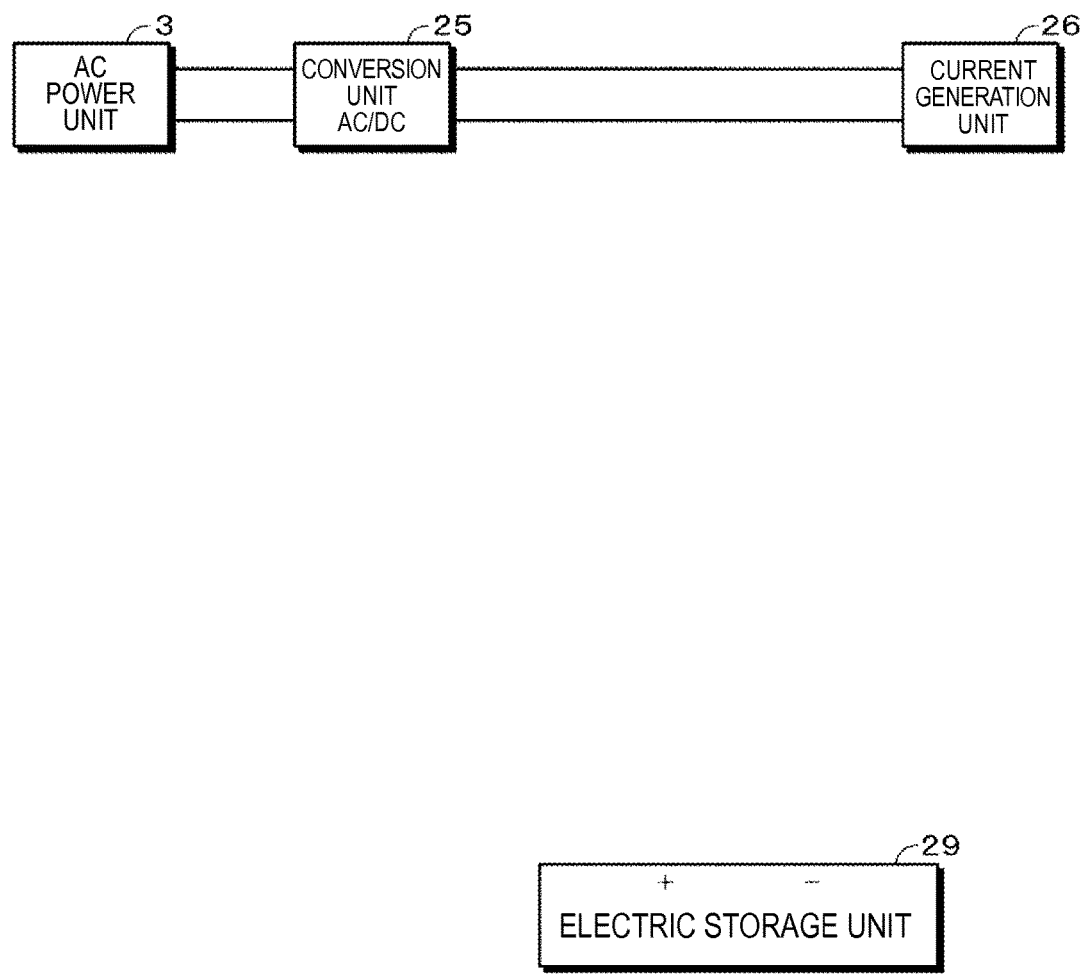
FIG. 8 is a diagram that describes an exemplary specific circuit configuration of the general electric storage device.

An example of a specific circuit configuration will be described. As shown in FIG. 8, in the general electric storage device 1, the power is not supplied from the electric storage unit 29 to the current generation unit 26.

Figure 9:
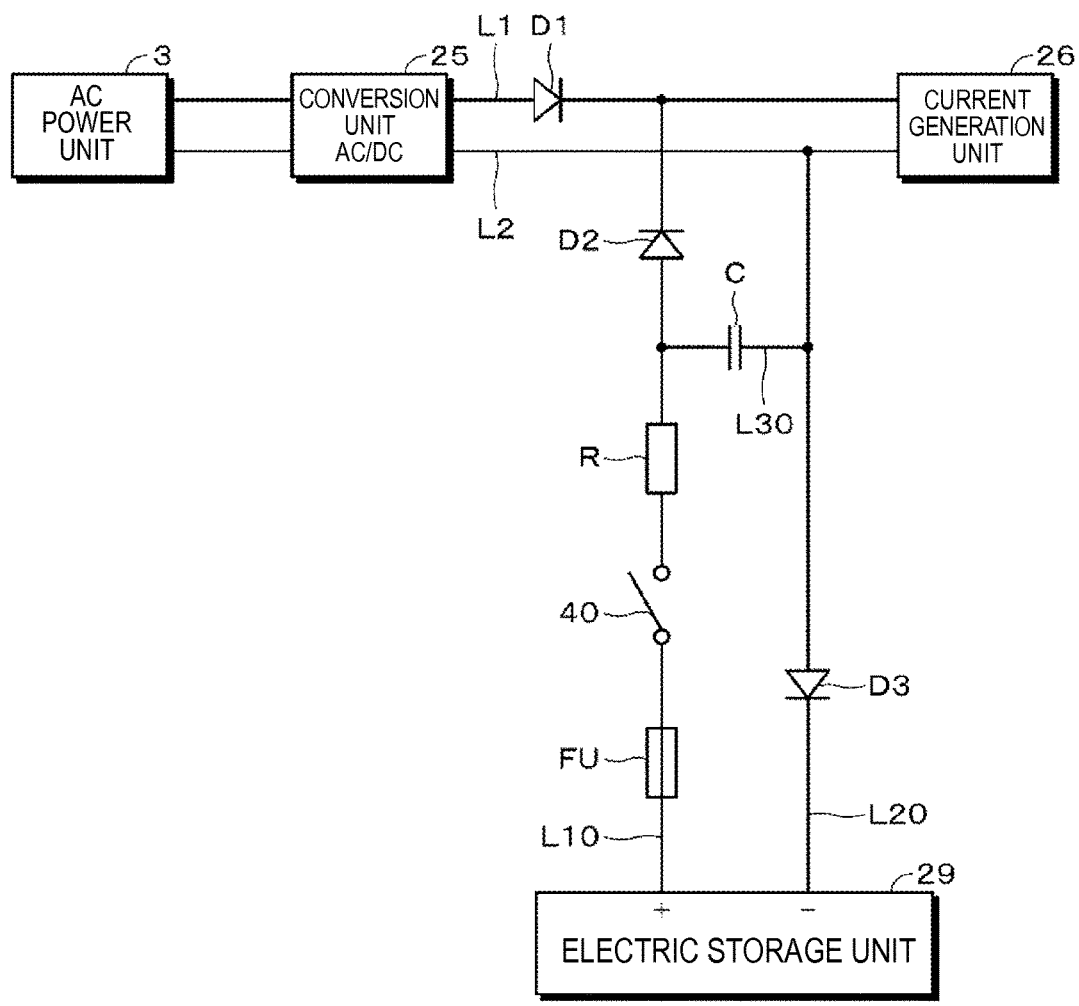
FIG. 9 is a diagram that describes an exemplary specific circuit configuration of the electric storage device in the present disclosure.

FIG. 9 shows an example of a specific circuit configuration between the electric storage unit 29 and the current generation unit 26 in the electric storage device 10. The AC-DC conversion unit 25 and the current generation unit 26 are connected by a power line L1 and a power line L2. A power line L10 is connected to the power line L1 and a power line L20 is connected to the power line L2. The power line L10 is connected to a positive electrode terminal of the electric storage unit 29, and the power line 20 is connected to a negative electrode terminal of the electric storage unit 29. By this configuration, the power of the electric storage unit 29 is connected to an input of the current generation unit 26.

A diode D1 is disposed to the power line L1. The diode D1 prevents a backward flow from the electric storage unit 29 to the AC-DC conversion unit 25 when the switch SW40 is turned on. The power line L10 is provided with a fuse FU, the switch SW40, a resistor R and a diode D2 from the electric storage unit 29 side. A mid-point of the resistor R and the diode D2 in the power line L10 and the power line L20 are connected by a line L30, and a capacitor C is connected to the line L30. A diode D3 is connected to the power line L20.

The fuse FU is molten down at the time of overcurrent and secures safety of the system. The diode D2 prevents the power from the AC power unit 3 from flowing to the electric storage unit 29 when the voltage of the electric storage unit 29 is low. The diode D3 prevents the current from flowing the power line L20 toward the power line L2. An analogue low-pass filter is formed from the resistor R and the capacitor C and removes a high-frequency component. Incidentally, a circuit configuration shown in FIG. 9 is an example, and the power of the electric storage unit 29 may be supplied to the current generation unit 26 by a circuit configuration different from the illustrated circuit configuration.

As described above, the electric storage device in the present disclosure can be started up even when there is no external power. Further, the standby power in the standby state can be made zero. Still further, in the case where there is an abnormality in a system of the electric storage device, by outputting the power of the electric storage device through the current generation unit, the relevant system and the electric storage unit are prevented from being electrically connected.

2. Second Embodiment

Since a configuration and an operation of an electric storage device in a second embodiment are the same as a configuration and an operation of the electric storage device 10 in the first embodiment, duplicated descriptions will be omitted. In the second embodiment, in the case where there is an external power supply in a state where the electric storage device 10 is shut down, a system of the electric storage device 10 is autonomously started up and charges the electric storage unit 29. Then, in the case where the externally supplied power diminishes or decreases, the electric storage device 10 autonomously shuts down the system and makes the standby power zero. In the second embodiment, the DC power unit 2 is described as a solar battery module.
"Flow of Processing"

Figure 10:
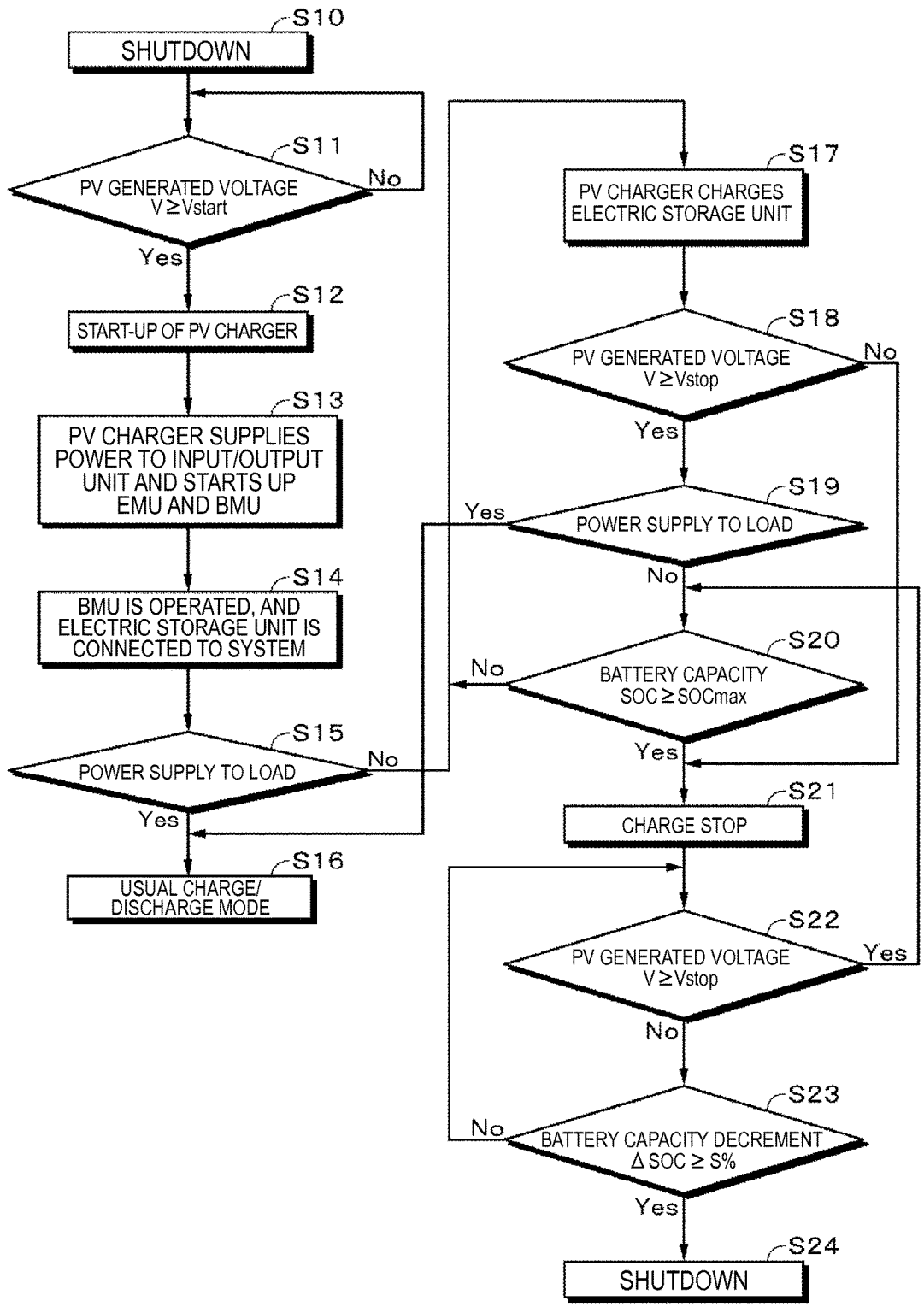
FIG. 10 is a flowchart that describes a flow of processing according to a second embodiment.

An example of a flow of processing of the electric storage device 10 in the second embodiment will be described with reference to a flow chart of FIG. 10. The electric storage device 10 is shut down in a step S10. That is, the switch SW 40 is turned off and the electric storage unit 29 is separated from the system in the electric storage device 10. As described above, the standby power in this state is zero. And, the processing proceeds to a step S11.

In a step S11, it is determined whether a generated voltage (PV generated voltage) V of the solar battery module is equal to or greater than a threshold value $V_{start}$. The threshold value $V_{start}$ is set to 100 V, for example. When the generated voltage V of the solar battery module is smaller than the threshold value $V_{start}$, the processing returns to the step S11, and the determination of the step S11 is repeated. When the generated voltage V of the solar battery module is equal to or greater than the threshold value $V_{start}$, the processing proceeds to a step S12.

In the step S12, the PV charger 20 is started up. The determination of the above-described step S11 is not performed by a microcomputer, etc. but the PV charger 20 is autonomously started up when the generated voltage V of the solar battery module becomes equal to or greater than the threshold value $V_{start}$. Of course, the generated voltage of the solar battery module may be supervised by the microcomputer, etc. Then, the step proceeds to a step S13.

In the step S13, the PV charger 20 supplies the power to the input/output unit 21. The EMU 27 and the BMU 28 connected to the input/output unit 21 are started up thereby. Then, the processing proceeds to a step S14. In the step S14, as the BMU 28 is operated, the electric storage unit 29 is connected to the system of the electric storage device 10. Next, the processing proceeds to a step S15.

In the step S15, whether it is necessary to supply the power to the load 4 is determined. This determination is performed by the EMU 27, for example. In the case where there is no need of supplying the power to the load 4, the processing proceeds to a step S16. In the case where there is no need of supplying the power to the load 4, the processing proceeds to a step S17.

In the step S16, the processing according to a usual charge/discharge mode is performed. The usual charge/discharge mode is a mode for charging/discharging according to, for example, an optional method. That is, in this mode, the power supplied from the solar battery module may be supplied to the load 4 or the power of the electric storage unit 29 may be supplied to the load 4. Further, while charging the electric storage unit 29 by the power supplied from the solar battery module, the power supplied from the AC power unit 3 may be supplied to the load 4.

In the step S17, the power formed by the PV charger 20 is supplied to the electric storage unit 29 through the input/output unit 21 and the BMU 28. Thus, the electric storage unit 29 is charged. Next, the processing proceeds to a step S18.

In the step S18, whether the generated voltage V of the solar battery module is equal to or greater than a threshold value $V_{stop}$ is determined. The threshold value $V_{stop}$ is set to 90 V, for example. In the case where the generated voltage V of the solar battery module is equal to or greater than the threshold value $V_{stop}$, the processing proceeds to a step S19. When the generated voltage V of the solar battery module is smaller than the threshold value $V_{stop}$, the processing proceeds to a step S21.

In the step S19, whether it is necessary to supply the power to the load 4 is determined. This determination is performed by the EMU 27, for example. In the case where it is necessary to supply the power to the load 4, the processing proceeds to the step S16. As described above, in the step S16, the processing according to the usual charge/discharge mode is performed.

In the case where there is no need of supplying the power to the load 4, the processing proceeds to a step S20. In the step S20, whether the state of charge (SOC) of the electric storage unit 29 is equal to or greater than a threshold value $SOC_{max}$ is determined. This determination is performed by the EMU 27 based on the information transmitted from the BMU 28, for example. The threshold value $SOC_{max}$ is set to 100%, for example. Incidentally, in the determination in the step S20, in place of the SOC, a depth of discharge (DOD) may be used to determine.

In the case where the SOC of the electric storage unit 29 is smaller than the threshold value $SOC_{max}$, the processing returns to the step S17, and the charge to the electric storage unit 29 is continued. In the case where the SOC of the electric storage unit 29 is greater than or equal to the threshold value $SOC_{max}$, the processing proceeds to a step S21. In the step S21, the charge is stopped because a capacity of the electric storage unit 29 increased. Next, the processing proceeds to a step S22.

In the step S22, whether the generated voltage V of the solar battery module is equal to or greater than the threshold value $V_{stop}$ is determined. In the case where the generated voltage V of the solar battery module is equal to or greater than the threshold value $V_{stop}$, the processing returns to the step S20. And, in the case where the SOC is determined to be decreased by the determination in the step S20, the processing returns to the step S17, and the charge to the electric storage unit 29 is resumed. In the case where the generated voltage V of the solar battery module is smaller than the threshold value $V_{stop}$, the processing proceeds to a step S23.

In the step S23, whether a decrement ΔSOC of the capacity of the electric storage unit 29 is equal to or greater than a threshold value S % is determined. The threshold value S % is set to 2%, for example. In the case where the decrement ΔSOC of the capacity of the electric storage unit 29 is smaller than the threshold value 2%, the processing returns to the step S22, and the determination of the step S22 is performed. In the case where the decrement ΔSOC of the capacity of the electric storage unit 29 is equal to or greater than the threshold value 2%, the processing proceeds to a step S24.

In the step S24, the electric storage device 10 is shut down. That is, the EMU 27 of the electric storage device 10 controls stoppage of operation of the BMU 28, etc. of the electric storage device 10, and, after that, turns off itself. Incidentally, in the case where a continuation time of a state where the PV generated voltage is smaller than the threshold value is measured by a timer, and a measurement time has passed a predetermined time, the electric storage device 10 may be shut down.

The generated voltage of the solar battery module varies depending on the weather, etc. Therefore, without shutting down the electric storage device 10 immediately after the charge is once stopped, the control in accordance with the generated voltage of the solar battery module is performed. In the case where the generated voltage of the solar battery module is equal to or greater than a certain value and the capacity of the electric storage unit decreased, the charge is performed again.

Further, in the case where a state where the generated voltage of the solar battery module is small continues and the capacity of the electric storage unit decreases by an amount equal to or greater than a certain value, the electric storage device is shut down in order to prevent the power of the electric storage unit from being consumed more by the operation of the EMU, etc.

Thus, in the case where the power is externally supplied in a state where the electric storage device is shut down, the system of the electric storage device is autonomously started up, and the electric storage unit is charged. In the case where the externally supplied power decreased, the electric storage device is shut down, and the standby power in the electric storage device is made zero.

3. Modification Example

In the above, embodiments of the present disclosure have been specifically described. However, the present disclosure can be variously modified without limiting to the above-described embodiments.

In the embodiments described above, the power of the electric storage unit is output through an existing current generation unit when the electric storage device is started up. However, a configuration in which a circuit that generates a constant current is separately disposed and the power of the electric storage unit is output through the circuit may be formed.

The configurations, methods, steps, shapes, materials and numerical values, which are cited in the embodiments described above are only examples, and, as required, configurations, methods, steps, shapes, materials and numerical values, which are different from these may be used. Further, the configurations, methods, steps, shapes, materials and numerical values in each embodiment can be combined with each other as long as a technical contradiction does not occur.

The present technology can also be applied to a so-called cloud system in which the exemplified processes are performed by a plurality of devices in a distributed manner. The present disclosure can be realized as a system that executes the processes exemplified in the embodiments and the modified examples, which is a device that executes at least some of the exemplified processes.

Further, the present disclosure can be realized, without limiting to the devices, as a method, a program, and a recording medium in which the program is recorded.

Additionally, the present technology may also be configured as below.

(1)

An electric storage device comprising:

a control unit, a charge/discharge management unit and a current generation unit, which are connected through an input/output unit; and an electric storage unit that is connected to the charge/discharge management unit and is connected to the current generation unit through a switch.

(2)

The electric storage device according to (1), wherein the control unit and the charge/discharge management unit are turned off and the switch is turned off in a shutdown state, and the switch is turned on when starting up from the shutdown state.

(3)

The electric storage device according to (2), wherein, in response to turning-on of the switch, the current generation unit generates a predetermined current based on power supplied from the electric storage unit, and outputs the generated current to the input/output unit.

(4)

The electric storage device according to (3), wherein the control unit and the charge/discharge management unit are turned on in a case where a voltage in the input/output unit reaches a predetermined operating voltage by a current supplied from the current generation unit.

(5)

The electric storage device according to any of (1) to (4), wherein the electric storage unit is charged based on a first current generated by the current generation unit in a case where a voltage of the electric storage unit is smaller than a threshold value, and the electric storage unit is charged based on a second current that is larger than the first current in a case where the voltage of the electric storage unit is larger than the threshold value.

(6)

The electric storage device according to (5), wherein a charge/discharge unit that generates the second current is connected to the input/output unit.

(7)

The electric storage device according to any of (1) to (6), wherein the current generation unit is configured with a constant-current direct current (DC)-DC converter.

(8)

The electric storage device according to any of (1) to (7), wherein the electric storage unit is configured with a plurality of lithium ion batteries.

(9)

The electric storage device according to any of (2) to (8), wherein, in a case where external power is supplied in the shutdown state, the control unit and the charge/discharge management are turned on based on the external power, and the electric storage unit is charged by the power.

(10)

An electric storage device comprising:

an electric storage unit; and a current generation unit that generates a charge current smaller than a usual charge current in a case where a voltage of the electric storage unit is smaller than a threshold value, wherein power output from the electric storage unit is supplied to the current generation unit at a time of start-up.

(11)

A start-up method of an electric storage device, the electric storage device including a control unit, a charge/ discharge management unit and a current generation unit, which are connected through an input/output unit, and an electric storage unit that is connected to the charge/discharge management unit and is connected to the current generation unit through a switch, the start-up method comprising:

turning off the control unit and the charge/discharge management unit and turning off the switch in a shutdown state and turning on the switch in a case of start-up from the shutdown state;

generating, by the current generation unit, a predetermined current based on power supplied from the electric storage unit in response to turning-on of the switch, and outputting the generated current to the input/output unit; and turning on the control unit and the charge/discharge management unit in a case where a voltage in the input/output unit reaches an operating voltage by a current supplied from the current generation unit.

4. Application Example

"Power Storage Device in House as Application Example"

Figure 11:
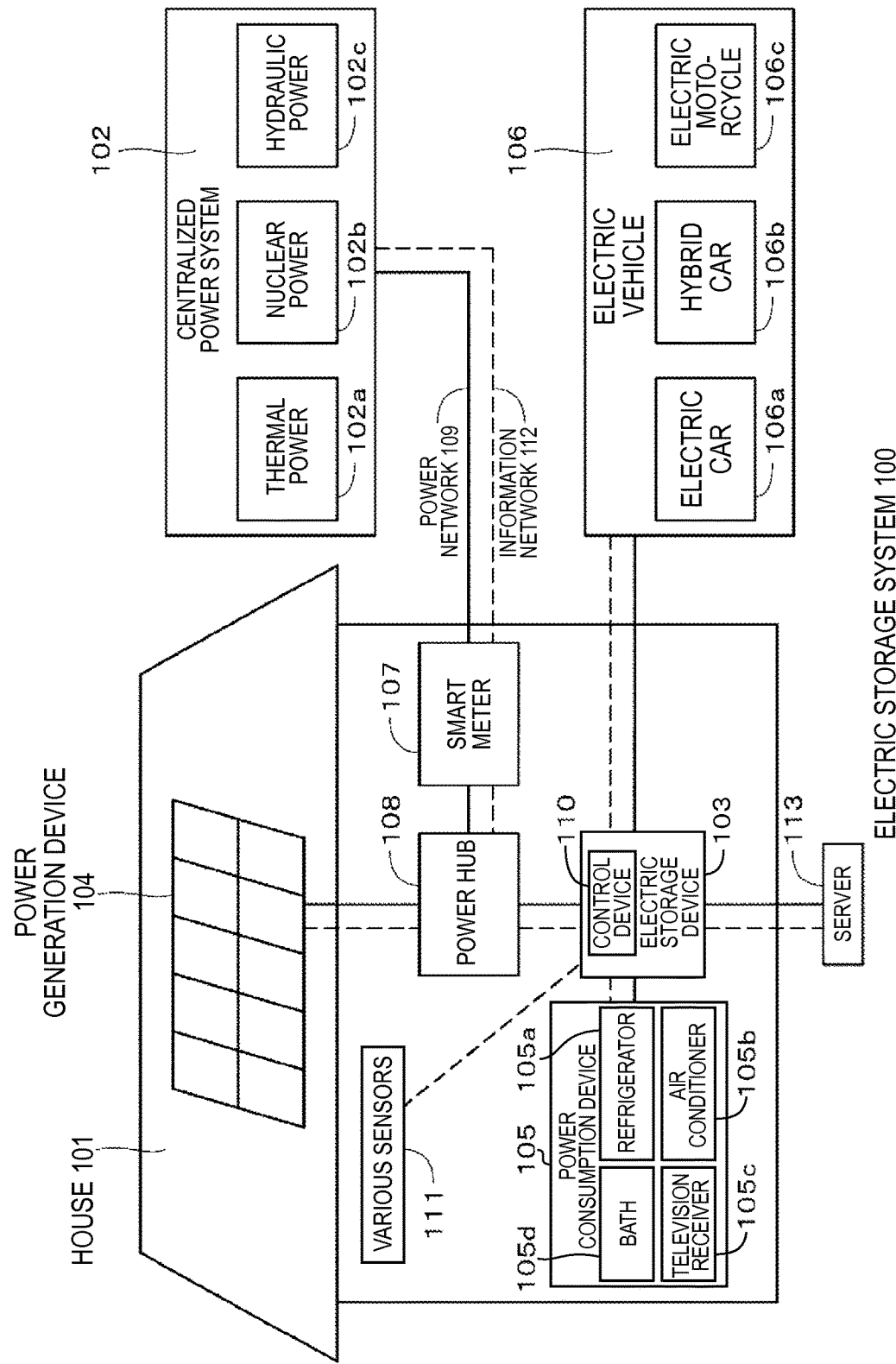
FIG. 11 is a diagram that describes an application example.

An example in which the present disclosure is applied to a power storage device for houses will be described with reference to FIG. 11. For example, in a power storage device 100 for a house 101, power is supplied to an electric storage device 103 from a centralized power system 102 such as thermal power 102a, nuclear power 102b, and hydraulic power 102c through a power network 109, an information network 112, a smart meter 107, a power hub 108, etc. Together with this, power is supplied to the electric storage device 103 from an independent power source such as a domestic power generation device 104. The power supplied to the electric storage device 103 is stored. The power used in the house 101 is supplied using the electric storage device 103. The same power storage device can be used not only in the house 101 but also in buildings.

The house 101 is provided with the domestic power generation device 104, a power consumption device 105, the electric storage device 103, a control device 110 controlling each device, the smart meter 107, and sensors 111 acquiring various kinds of information. The devices are connected through the power network 109 and the information network 112. A solar cell, a fuel cell, etc. are used as the domestic power generation device 104, and generated power is supplied to the power consumption device 105 and/or the electric storage device 103. The power consumption device 105 is a refrigerator 105a, an air conditioner 105b, a television receiver 105c, a bath 105d, etc. Moreover, the power consumption device 105 includes an electric vehicle 106. The electric vehicle 106 is an electric car 106a, a hybrid car 106b, and an electric motorcycle 106c.

The electric storage device 103 is constituted by secondary batteries or a capacitor. For example, the electric storage device 103 is constituted by lithium ion secondary batteries. The electric storage device 10 of the present disclosure described above is applied to the electric storage device 103. The lithium ion secondary battery may be a stationary type or may be one used in the electric vehicle 106. The smart meter 107 has a function of measuring a use amount of commercial power and transmitting the measured use amount to an electric power company. The power network 109 may be of one of direct current power supply, alternating current power supply, and noncontact power supply or of the combination of a plurality of them.

The various sensors 111 are a human sensor, an illumination sensor, an object detection sensor, a power consumption sensor, a vibration sensor, a contact sensor, a temperature sensor, an infrared sensor, etc., for example. The information acquired by the various sensors 111 is transmitted to the control device 110. Weather conditions, human conditions, etc. are grasped based on the information from the sensors 111, and it is possible to automatically control the electric consumption device 105 so that energy consumption is minimum. Moreover, the control device 110 can transmit information about the house 101 to an external electric power company, etc. through an internet.

The power hub 108 performs processing of branch of a power line, direct current-alternating current conversion, etc. As a communication system of the information network 112 connected to the control device 110, there are a method of using a communication interface such as a universal asynchronous receiver-transmitter (UART (transmission and reception circuit for asynchronous serial communication)) and a method of using a sensor network by a wireless communication standard such as Bluetooth (registered trademark), ZigBee (registered trademark), and Wi-Fi (registered trademark). The Bluetooth system is applied to multimedia communication, and the communication of one-to-many connection is possible. The ZigBee uses a physical layer of institute of electrical and electronics engineers (IEEE) 802.15.4. The IEEE802.15.4 is a name of a short distance wireless network standard referred to as personal area network (PAN) or Wireless (W) PAN.

The control device 110 is connected to an external server 113. The server 113 may be managed by any of the house 101, an electric power company, and a service provider. The information transmitted and received by the server 113 is power consumption information, life pattern information, power rates, weather information, natural disaster information, and information about power transaction, for example. Such information may be transmitted and received by a domestic electric consumption device (a television receiver, for example), and may be transmitted and received by a device outside home (a cellular phone, etc., for example). Such information may be displayed on a device having a display function, e.g. a television receiver, a cellular phone, personal digital assistants (PDA), etc.

The control device 110 controlling each unit is constituted by a CPU, a RAM, a ROM, etc., and stored in the electric storage device 103 in this example. The control device 110 is connected to the electric storage device 103, the domestic power generation device 104, the power consumption device 105, the various sensors 111, and the server 113 through the information network 112, and has a function of adjusting a use amount of commercial power and a power generation amount. In addition, the control device 110 may have a function of performing power transaction in the power market, etc.

As illustrated above, not only power from the centralized power system 102 such as the thermal power 102a, the nuclear power 102b, and the hydraulic power 102c but also power generated by the domestic power generation device 104 (solar power generation, wind power generation) can be stored in the electric storage device 103. Therefore, even when power generated by the domestic power generation device 104 is varied, it is possible to perform control of keeping electric energy transmitted to the outside constant or discharging only a required amount. For example, it is also possible to adopt a use in which power obtained by solar power generation is stored in the electric storage device 103 and, at the same time, midnight power that is cheaper in cost during night is stored in the electric storage device 103 so that the power stored by the electric storage device 103 is discharged and used in the daytime period when the cost is high.

Note that although this example describes the case in which the control device 110 is stored in the electric storage device 103, the control device 110 may be stored in the smart meter 107 or may be constituted individually. Moreover, the power storage device 100 may be used for a plurality of households in an apartment house, or may be used for a plurality of detached houses.

"Power Storage Device in Vehicle as Application Example"

Figure 12:
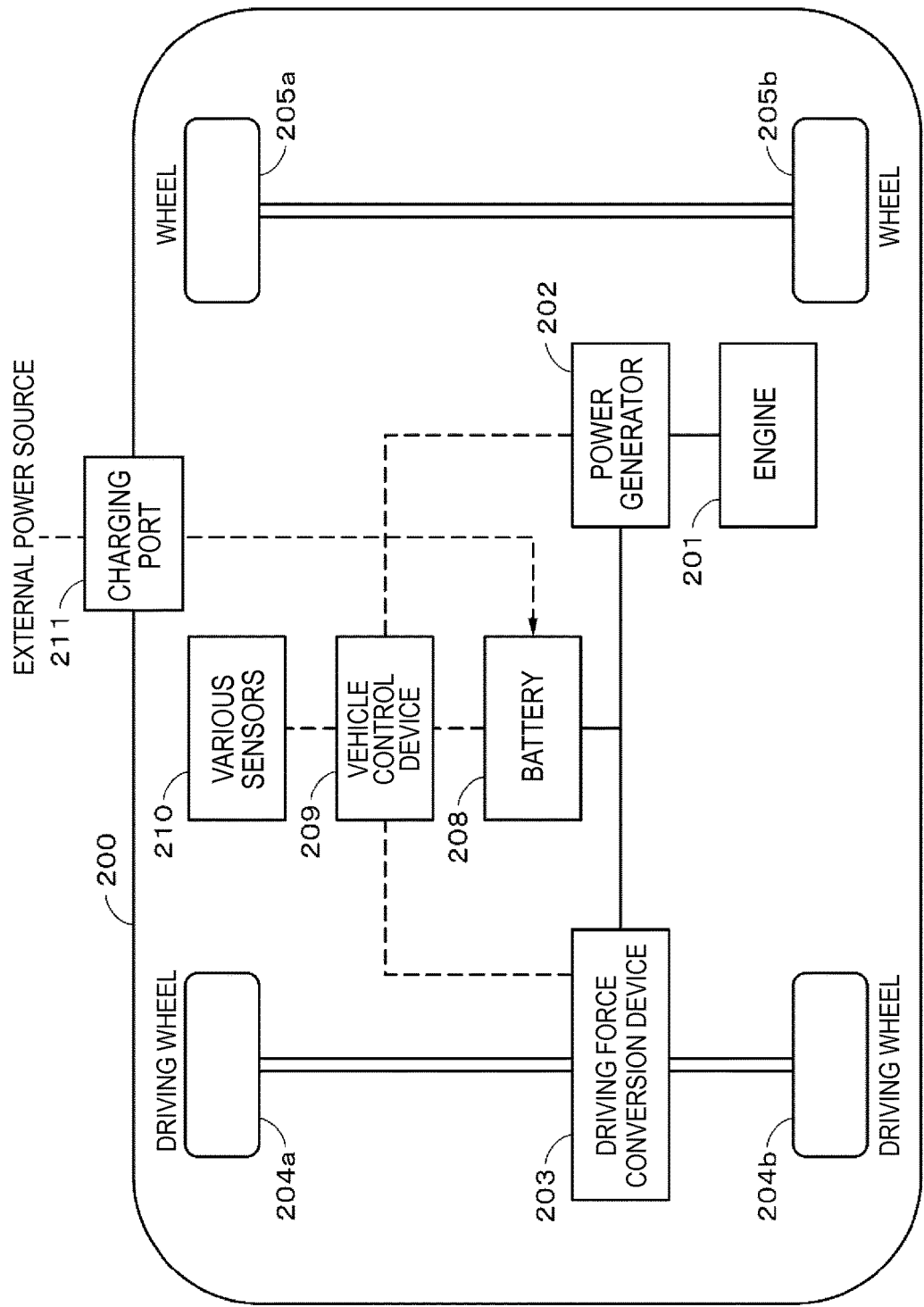
FIG. 12 is a diagram that describes an application example.

An example in which the present disclosure is applied to the power storage device for vehicles will be described with reference to FIG. 12. FIG. 12 schematically illustrates an example of a configuration of a hybrid vehicle adopting a series hybrid system to which the present disclosure is applied. The series hybrid system is a car traveling by power driving force conversion device using power generated by a power generator driven by an engine or such power stored temporarily in a battery.

On this hybrid vehicle 200, an engine 201, a power generator 202, a power driving force conversion device 203, a driving wheel 204a, a driving wheel 204b, a wheel 205a, a wheel 205b, a battery 208, a vehicle control device 209, various sensors 210, and a charging port 211 are mounted.

The hybrid vehicle 200 travels with the power driving force conversion device 203 as a driving source. One example of the power driving force conversion device 203 is a motor. The power driving force conversion device 203 is driven by power of the battery 208, and the rotation force of the power driving force conversion device 203 is transmitted to the driving wheels 204a and 204b. Note that with the use of direct current-alternating current (DC-AC) or inverse conversion (AC-DC conversion) at necessary parts, the power driving force conversion device 203 can be also applied to an alternating current motor and a direct current motor. The various sensors 210 control engine speed through the vehicle control device 209 and controls opening of a throttle valve not illustrated (throttle opening). The various sensors 210 include a speed sensor, an acceleration sensor, an engine speed sensor, etc.

The rotation force of the engine 201 is transmitted to the power generator 202, and power generated by the power generator 202 using the rotation force can be stored in the battery 208.

When the speed of the hybrid vehicle is reduced by a braking mechanism not illustrated, the resistance at the time of reduction of speed is added to the power driving force conversion device 203 as rotation force, and regenerative electric power generated by the power driving force conversion device 203 using the rotation force is stored in the battery 208.

The battery 208 is connected to an external power source of the hybrid vehicle, and thus receives power supply from the external power source with the charging port 211 as an input port and can also store the received power. The electric storage device 10, for example, may be applied to the battery 208.

Although not illustrated, there may be provided an information processing device performing information processing regarding vehicle control based on information about the secondary batteries. Such an information processing device includes an information processing device performing battery remaining amount display based on information about a battery remaining amount.

The above has described, as an example, the series hybrid car traveling by a motor using power generated by the power generator driven by the engine or such power temporarily stored in the battery. However, the present disclosure can be also applied effectively to a parallel hybrid car having output of both an engine and a motor as a driving source and using three systems of travel only by the engine, travel only by the motor, and travel by the engine and the motor while switching them appropriately. Moreover, the present disclosure can be also applied effectively to a so-called electric vehicle, which travels by drive by only a driving motor without an engine.

REFERENCE SIGNS LIST 1 general electric storage device
2 DC power unit
3 AC power unit
4 load
10 electric storage device in the present disclosure (one example)
21 input/output unit
24 charge/discharge unit
26 current generation unit
27 EMU
28 BMU
29 electric storage unit

The invention claimed is:

1. An electric storage device, comprising:
a control unit, a charge/discharge management unit, and a current generation unit, which are connected through an input/output unit; and
an electric storage unit that is connected to the charge/discharge management unit, and is further connected to the current generation unit through a switch, wherein:
the current generation unit is configured to generate a first current to charge the electric storage unit based on a voltage of the electric storage unit that is lower than a threshold value,
the switch is configured to be turned off in a shutdown state of the electric storage device, and
the control unit and the charge/discharge management unit are configured to consume zero power during a standby state of the electric storage device.

2. The electric storage device according to claim 1, wherein
the control unit and the charge/discharge management unit are configured to be turned off in the shutdown state of the electric storage device, and
the switch is further configured to be turned on when starting up the electric storage device from the shutdown state.

3. The electric storage device according to claim 2, wherein, in response to turning-on of the switch, the current generation unit is further configured to:
generate a predetermined current based on power supplied from the electric storage unit, and
output the predetermined current to the input/output unit.

4. The electric storage device according to claim 3, wherein the control unit and the charge/discharge management unit are turned on in a case where a voltage in the input/output unit reaches a predetermined operating voltage by a second current supplied from the current generation unit.

5. The electric storage device according to claim 1, wherein the electric storage unit is charged based on a second current that is larger than the first current in a case where the voltage of the electric storage unit is larger than the threshold value.

6. The electric storage device according to claim 5, wherein a charge/discharge unit that generates the second current is connected to the input/output unit.

7. The electric storage device according to claim 1, wherein the current generation unit is configured with a constant-current direct current (DC)-DC converter.

8. The electric storage device according to claim 1, wherein the electric storage unit is configured with a plurality of lithium ion batteries.

9. The electric storage device according to claim 2, wherein, in a case where external power is supplied in the shutdown state, the control unit and the charge/discharge management unit are turned on based on the external power, and the electric storage unit is charged by the external power.

10. An electric storage device, comprising:
an electric storage unit;
a control unit;
a charge/discharge management unit; and
a current generation unit that is configured to generate a charge current smaller than a usual charge current in a case where a voltage of the electric storage unit is smaller than a threshold value; and
a switch configured to connect the electric storage unit to the current generation unit, wherein:
power output from the electric storage unit is supplied to the current generation unit at a time of start-up of the electric storage device,
the switch is configured to be turned off in a shutdown state of the electric storage device, and
the control unit and the charge/discharge management unit are configured to consume zero power during a standby state of the electric storage device.

11. The electric storage device according to claim 1, wherein the switch is further configured to be turned off in a normal operation state of the electric storage device.

* * * * *